UNITED STATES PATENT OFFICE.

HENRY ARDEN, OF SAN FRANCISCO, CALIFORNIA, ASSIGNOR TO JOHN TREADWELL, OF OAKLAND, CALIFORNIA.

PROCESS OF REDUCING ORES.

No. 801,129.     Specification of Letters Patent.     Patented Oct. 3, 1905.

Application filed April 21, 1903. Renewed May 31, 1905. Serial No. 263,153.

*To all whom it may concern:*

Be it known that I, HENRY ARDEN, a citizen of the United States, residing at San Francisco, California, have invented a certain new and useful Process of Reducing Ores, of which the following is a specification.

This invention is more especially applicable to the reduction of finely-comminuted or sand ore.

I mix crude petroleum or any of its less volatile fractions with water-glass in solution. With this I put finely-pulverized coal or lignite, or the dust thereof, and the finely-divided ore or sand to be reduced. I then form this mass into briquets or other forms and place them in an oven or furnace, where they are subjected to combustion, preferably slow combustion. The effect of this combustion is the formation of a coke which holds together the particles of the ore and at the same time produces a partial reduction of the ore, (if the relative temperatures of the burning mass and the heat of dissociation of the ore permit.) When coked as aforesaid, the mass is subjected to a stronger heat, with the addition of the necessary fluxes and more carbon, if necessary, either in the same furnace or in another suitable furnace to which it is removed and the reduction completed. The proportions when my carbon is a lignite of about forty per cent. carbon and my ore magnetite are: equal portions, by weight, of the lignite and ore; relative proportions of water-glass to the hydrocarbon, one to three or one to four, with enough water to dissolve the water-glass to about the consistency of the hydrocarbon. These are mixed together and added to the coal and ore in sufficient quantity to make the mass the proper consistency to form the briquets. The above proportions can be varied within wide ranges, depending on the nature of the hydrocarbon, the nature of the coal or lignite, and the nature of the ore, or of any two or all of them.

My process is very applicable to the new method, whereby the sulfids of metal are separated by oil from the gangue and oxids of metals. After the oil has become loaded with the sulfid, instead of separating the oil and sulfid by centrifugal or other means, as now done, I use the same (oil and sulfids) as mixed as part of the ingredients of my briquet.

The use of a hydrocarbon and water-glass in combination is essential to the best results in the production of an ore briquet. A briquet consisting of ore, coal, and petroleum would not retain its form when subjected to moderately-high temperatures much below those at which the reduced metal melts. The heated briquets would become soft and would crumble under the pressure of the load in the furnace. Furthermore, the briquet without water-glass evolves much smoke, which burns with a yellowish flame. The water-glass practically prevents the evolution of smoke, and the flame is white and not so voluminous. It is probable that the water-glass is decomposed under the effect of the heat and the carbon dioxid in the products of combustion, forming sodium carbonate and silicic acid, the latter changing to a thin covering of silica. The advantage arising from the use of water-glass in ore briquets is such that its cost may be neglected.

What I claim, and desire to obtain Letters Patent for, is—

1. The herein-described method of briqueting finely-divided ores which consists in mixing with the same carbonaceous matter, a hydrocarbon, and water-glass, and forming the mixture into coherent masses, substantially as described.

2. The herein-described method of briqueting finely-divided ores which consists in mixing with the same carbonaceous matter, a hydrocarbon, and water-glass, forming the mixture into coherent masses, and coking said masses, substantially as described.

3. The herein-described method of reducing finely-divided ores which consists in mixing with said ores carbonaceous matter, a hydrocarbon, and water-glass, forming the mixture into coherent masses, coking said masses, and finally reducing the ores, substantially as described.

4. A briquet containing finely-divided ores, carbonaceous matter, a hydrocarbon, and water-glass, substantially as described.

5. A briquet containing finely-divided ores, carbonaceous matter, the less volatile fractions of crude petroleum, and water-glass, substantially as described.

HENRY ARDEN.

Witnesses:
NAT. M. RAPHAEL,
T. A. PAGE.